United States Patent
Russ

[11] 3,712,235
[45] Jan. 23, 1973

[54] CUP HOLDER

[75] Inventor: Edwin Russ, Madison Heights, Mich

[22] Filed: Aug. 11, 1971

[21] Appl. No.: 170,842

[52] U.S. Cl............................................108/46
[51] Int. Cl........................................A476 23/00
[58] Field of Search....................108/44, 45, 46, 47

[56] References Cited

UNITED STATES PATENTS

| | | | |
|---|---|---|---|
| 1,836,511 | 12/1931 | Serems | 108/46 |
| 1,863,368 | 6/1942 | Folmer | 108/47 |
| 2,763,378 | 9/1956 | Black | 211/88 |
| 3,338,628 | 8/1967 | Evans | 108/47 |

FOREIGN PATENTS OR APPLICATIONS

| | | | |
|---|---|---|---|
| 214,541 | 3/1958 | Australia | 108/46 |
| 320,987 | 10/1929 | Britain | 108/46 |
| 216,880 | 6/1958 | Australia | 108/46 |

Primary Examiner—Francis K. Zugel
Assistant Examiner—Glenn O. Finch
Attorney—Whittemore, Hulbert & Belknap

[57] ABSTRACT

The holder has a pair of elongated anchoring leg extensions connected by hinge formations to a flat article supporting panel, the legs, panel and formations being molded of a suitable synthetic plastic composition in the form of a one-piece unit. The panel and each of the anchor legs carry bracing and stop elements, integrally molded on the respective leg and panel parts, which elements carry tongue and groove-type edge formations for frictional and releasable mating engagement with one another when the holder is set up on an operative article supporting condition. As thus set up the legs extend downwardly into the usual upwardly opening window recess of an automobile door, with the supporting panel extending horizontally inwardly of the door to one side of and just ahead of an occupant. The respective leg and panel-borne bracing and stop elements then have edge-abutting stop engagement with one another; yet upon manual disengagement of said elements from their mated relationship the legs may be swung into a compactly collapsed relation to the article supporting panel.

7 Claims, 1 Drawing Figure

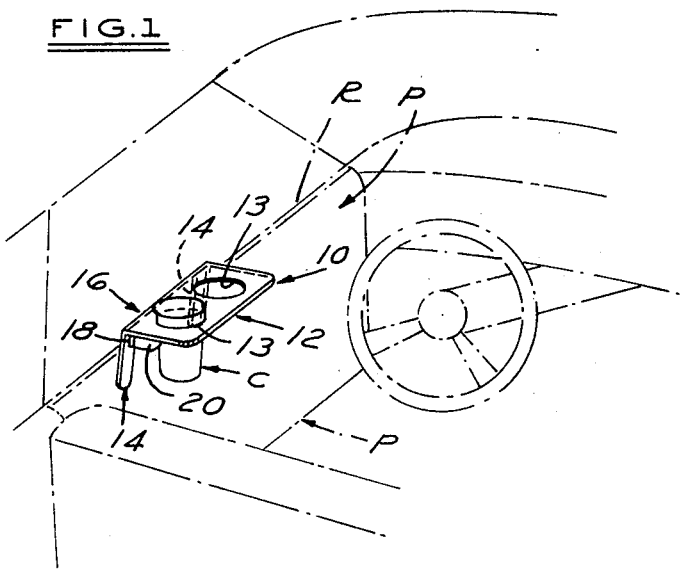
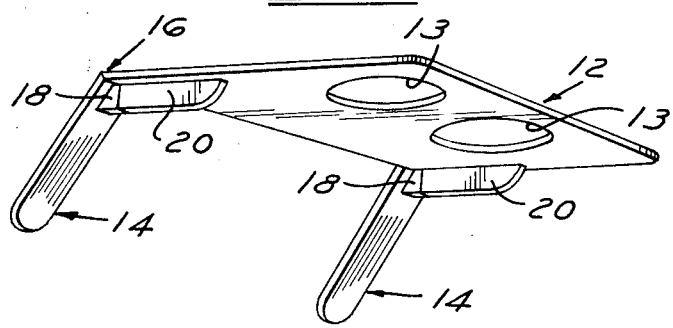
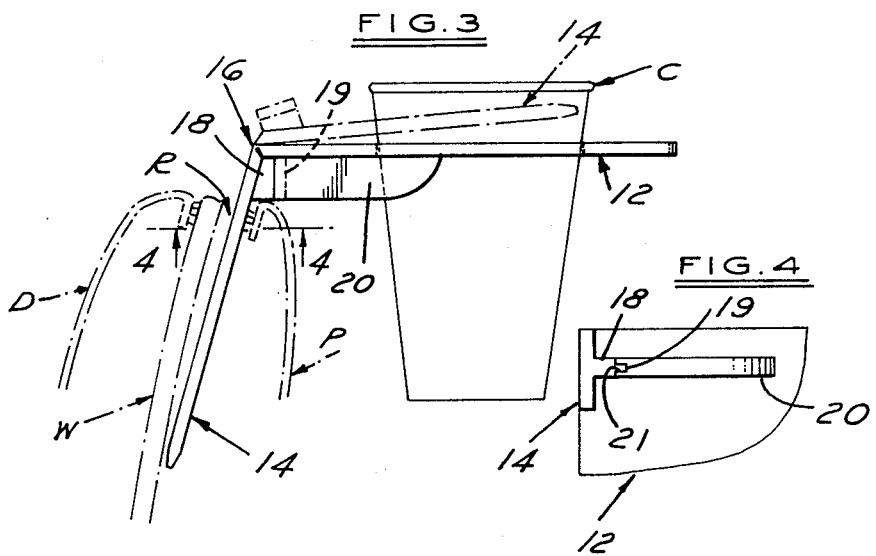

CUP HOLDER

BACKGROUND OF THE INVENTION

The holder device has a primarily intended use, as herein illustrated, in supporting drink-filled paper cups as their content is being consumed at a drive-in type establishment, or in transporting such articles by automobile from the establishment for home consumption of the contents. To this end the holder device features a panel which is apertured to nestingly receive and stably support the cups. In particular, the readily collapsible nature of the holder when not in use renders it capable of being stored in compact form in the glove compartment or beneath the front seat of the owner's vehicle. However, adaptations of the improvement of the invention in structurally modified forms to various other types of tray-like holder are also of course contemplated.

SUMMARY OF THE INVENTION

The holder, as removably frictionally applied at a pair of anchor legs therof in the upwardly opening window recess of an automobile door, in wedged engagement with the lowered window panel, presents a generally horizontal article sustaining panel or like tray member which is suitably configured to hold paper cups or other containers; and upon completion of its use the legs are withdrawn from the recess and folded throughout more than 180° into a substantial parallelism thereof to the supporting panel, of which they constitute integrally connected extensions. This collapsibility of the parts enables the improvement to be compactly packaged for storage and shipment, and as equally compactly stowed pending a next use, as mentioned above, in an out-of-the-way place. The holder is very stable in nature when operatively set up on the automobile door, inasmuch as, even though it is in the form of a one-piece, integrally hinged unit, its releasably engaged tongue-and-groove components afford an effective bracing action to rigidify the holder as a whole.

BRIEF DESCRIPTION OF THE DRAWINGS

FIG. 1 is a top perspective view of the holder as operatively installed on the door of an automobile, some of the latter's interior features being depicted in dot-dash line;

FIG. 2 is a bottom perspective view of the holder in its erected and braced condition;

FIG. 3 is a view in rear-to-front elevation of the installed and anchored cup holder, a swingingly collapsed position of its anchoring leg portions being depicted in dot-dash line; and FIG. 4 is a fragmentary bottom plan view showing the releasable interlock of anchoring leg and panel bracing components of the holder when in the erected condition thereof shown in FIG. 3.

DESCRIPTION OF A PREFERRED EMBODIMENT

FIG. 1 illustrates the holder of the invention, generally designated by the reference numeral 10, in operative position as installed in an upwardly opening recess R (FIG. 3) of a conventional automobile door D, just inwardly of the latter's retractible window panel W. In this inserted position a portion of the holder structure 10 rests downwardly atop an inner panel member P of the door structure and is thus sustained stably, as appears in FIGS. 1 and 3.

Holder 10 is herein shown in an embodiment as a holder for conventional paper cups C containing a drink, whether for consumption by a car occupant or occupants at a drive-in food and drink establishment, or in transporting the containers from such establishment for home consumption. To this end the holder 10, as basically constituted by a generally horizontally disposed rectangular supporting panel 12 and a pair of like anchoring legs 14 integrally hinged to the panel, has said panel 12 molded to provide with a pair of circular openings 13 which are located inwardly of and adjacent the free edge of the panel and are equally spaced from one another in reference to the front-to-rear dimension of panel 12.

Openings 13 are, in the interest of standardization, of equal diameter sufficiently large to accommodate a substantial length of the wall of the largest cup likely to be handled; if necessary, a smaller cup can be nested within a larger. However, as suggested above, such panel may be a simple flat one, or it may be any of various tray-like forms, edge-bordered or otherwise, suitable for the intended purpose, in particular being capable of mass production by a conventional plastic molding procedure and sized for collapse and storage in the previously discussed manner. As for the material of the supporting panel and anchoring leg components, it may be of any attractive, at least substantially rigid synthetic plastic moldable in the special sheet form hereinafter described. A number of such compositions are available on the market.

The anchoring legs 14 are identical, being located at corners of panel 12 and being sufficiently elongated to permit a stable mount of holder 10 in door recess R whether wedged or merely bearing outwardly against window W (FIG. 3); and they are of sufficient width to permit a hinged union of the latter to panel 12 which is itself laterally stable, yet sufficiently flexible to permit the intended swinging collapse of the legs 14 into general parallelism with panel 2. Legs 14 are depicted in dot-dash line in FIG. 3 in such collapsed condition.

To this end, the integral hinging connection of the legs to the panel 12, designated by the reference numeral 16, is molded in the material as a linear indentation, of a length equalling the leg's width, which will be of an open V-shape as the holder 10 is molded in the flat between specially contoured mold or die members. One of these will be equipped, at locations corresponding to the aligned transverse zones of hinge connections 16, with appropriate protruding V-formations which occasion a reduced thickness of the molded sheet material at corresponding hinge zones. The degree of reduction is sufficient to insure a desired degree of repeated flexure for the intended purpose, yet enabling sides of each molded hinge formation 16 to take abutting engagement when holder 10 is set up, as shown in FIG. 3.

Further pursuant to the invention, the molding die means is also configured to produce a pair of integral projecting, block-like bracing and interlocking elements 18 of generally rectangular shape projecting in the manner of the stem of a T from the mid-point of each anchoring leg 14, as best shown in Fig. 4. Each such integral interlocking and bracing element or formation 18 terminates in an integral centered interlocking tongue 19, which is co-extensive in length, as appears in FIG. 3, with the height of element 18. The latter is located directly adjacent the hinge connection 16 of its anchoring leg 14 to the supporting panel 12.

Further, the panel 12 is molded to afford a pair of like projecting bracing and interlocking elements or formations 20 for coaction with the leg's elements 18. Each formation 20 is of an elongated nature, extending a substantial distance outwardly of the hinged edge corner of panel and paralleling the latter's other margin. It is rabbeted at 21 (FIG. 4) to provide a groove co-entensive in length with the height of element 20, as appears in FIG. 3; and the pairs of the tongues 19 and grooves are in end-to-end alignment with one another in a vertical plane at 90° to the line of hinge connections 16. The elements 18, 20 are so located, and their tongue and groove means are so sized, that said elements will be in end engagement with one another, and their tongues and grooves will be fully engaged, when supporting panel 12 is in the operative horizontal position appearing in FIGS. 3 and 4, also suggested in FIGS. 1 and 2. In this position the bracing and interlocking elements 18 rest stably upon the rounded top of the inner door panel P; and the interfit of elements 18 and 20 rigidifies the holder 10 in the direction of its hinge 16, without interfering with a ready manual collapsing of the same when desired. Similarly, the elements 18 and 20 strongly buttress panel 12 in the vertical sense when in its operative horizontal position. As dismounted from door D, the legs 14 may be swung through an angle approaching 270° to dispose them in the dot-dash line storage position of FIG. 3.

Although practical considerations of cost, appearance and the like suggest the advantage of molding holder 10 as a one-piece integrally articulated leg and panel unit, other considerations may indicate the desirability of a plural part holder construction, for example, one in which the support panel and anchor leg components are pivotally articulated, as by piano hinge means, for the swingable collapse action mentioned above. Whatever the construction, the feature of collapsibility, coupled with a strongly braced and interlocking relationship of the parts when in use, is a desirable one, in particular in a holder which is the property of the automobile owner, intended for occasional use in its erected or set-up condition.

What is claimed is:

1. An article holder removably mountable to an automobile door, comprising an anchoring part having a pair of surfaces insertable to an operative position at a downward angle within a slot-like upright door recess, thus to support the holder on the door, and an article holder part having upper and lower surfaces hingedly connected to said anchoring part to swing into and out of a substantial horizontal, operative article supporting position, with the lower surface of said holder part being arranged at a substantial angle to the adjacent one of the surfaces of said anchoring part, as the latter is thus operatively positioned in said door recess, [said parts] the lower surface of said holder part and said one surface of said anchoring part having integral elements projecting [from adjacent surfaces thereof] therefrom, which elements have releasable tongue and groove-type frictional formations for mating engagement with one another in said operative positions of the respective parts to brace and releasably interlock said parts, at least one of said elements having a surface adapted to engage an automobile door when said parts are in said operative position to provide additional support for the holder on the door.

2. The holder of Claim 1 in a one-piece form, in which said parts are integrally connected to one another through an integral flexible hinge formation.

3. The holder of Claim 1, in which said elements are located on the respective parts directly adjacent the axis of relative swing thereof.

4. The holder of Claim 2, in which said elements are located on the respective parts directly adjacent said integral connection thereof.

5. The holder of Claim 1, in which said elements have said mating engagement at a tongue on one of said elements and a groove on the other element, said tongue and groove being elongated in a direction at 90° to the axis of relative swing of said parts.

6. The holder of Claim 2, in which said elements have said mating engagement at a tongue on one of said elements and a groove on the other element, said tongue and groove being elongated in a direction at 90° to the axis of relative swing of said parts.

7. An article holder removably mountable to an automobile door, comprising a one-piece plastic structure having an anchoring part insertable to an operative position at a downward angle within a slot-like upright door recess, thus to support the holder on the door, and an article holder part hingedly connected to said anchoring part to swing into and out of a substantial horizontal, operative article supporting position at a substantial angle to said anchoring part, as the latter is thus operatively positioned in said door recess, said parts having integral elements projecting from adjacent surfaces thereof, which elements have releasable tongue and groove-type frictional formations for mating engagement with one another in said operative positions of the respective parts, said parts being integrally connected to one another through an integral flexible hinge formation.

* * * * *